United States Patent [19]

Beretta et al.

[11] 4,239,638

[45] Dec. 16, 1980

[54] USE OF SYNTHETIC HYDROCARBON OILS AS HEAT TRANSFER FLUIDS

[75] Inventors: David Beretta, Middlebury; Frederick C. Loveless, Cheshire; Walter Nudenberg, Newtown, all of Conn.

[73] Assignee: Uniroyal, Inc., New York, N.Y.

[21] Appl. No.: 957,511

[22] Filed: Nov. 3, 1978

Related U.S. Application Data

[63] Continuation-in-part of Ser. No. 853,935, Nov. 22, 1977, abandoned.

[51] Int. Cl.³ ............................................. C09K 5/00
[52] U.S. Cl. ................................. 252/73; 126/900; 165/104 M; 585/10; 585/12; 585/17; 585/18
[58] Field of Search .................. 252/73; 585/255, 16, 585/521, 10, 12, 17, 13, 502, 18, 510; 165/104 M; 126/900

[56] References Cited

U.S. PATENT DOCUMENTS

| | | | |
|---|---|---|---|
| 3,630,916 | 12/1971 | Thompson | 252/78.5 X |
| 3,763,244 | 10/1973 | Shubkin | 585/510 X |
| 3,958,624 | 5/1976 | Peeler et al. | 252/75 X |
| 4,041,098 | 8/1977 | Loveless | 585/521 |
| 4,110,234 | 8/1978 | Loveless et al. | 252/26 X |
| 4,117,831 | 10/1978 | Bansal et al. | 126/271 |
| 4,122,021 | 10/1978 | Loveless et al. | 252/26 |

*Primary Examiner*—Harris A. Pitlick
*Attorney, Agent, or Firm*—Thomas A. Beck

[57] ABSTRACT

Poly-alpha-olefin oils having high flash points useful as heat transfer fluids in solar and industrial applications.

32 Claims, 4 Drawing Figures

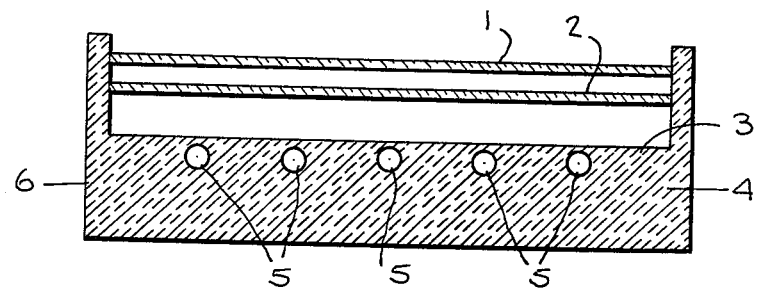
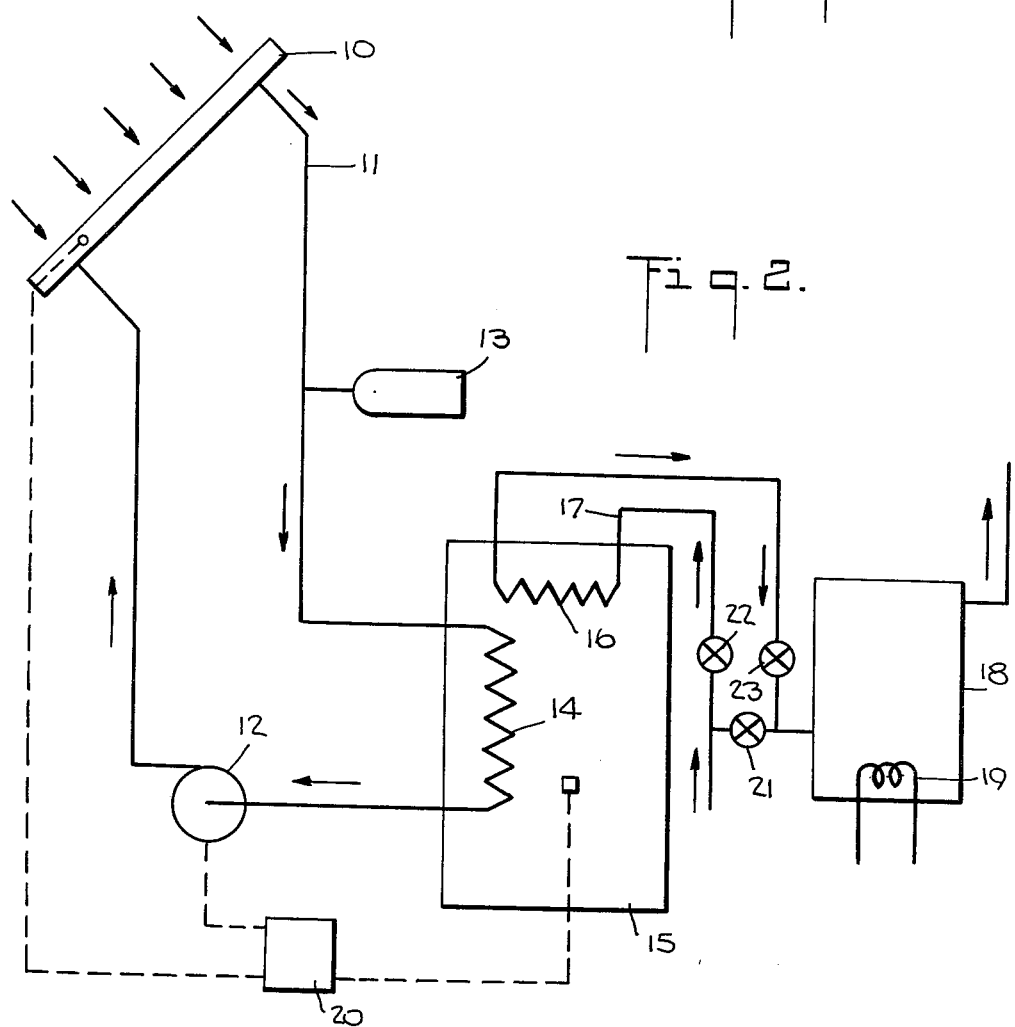

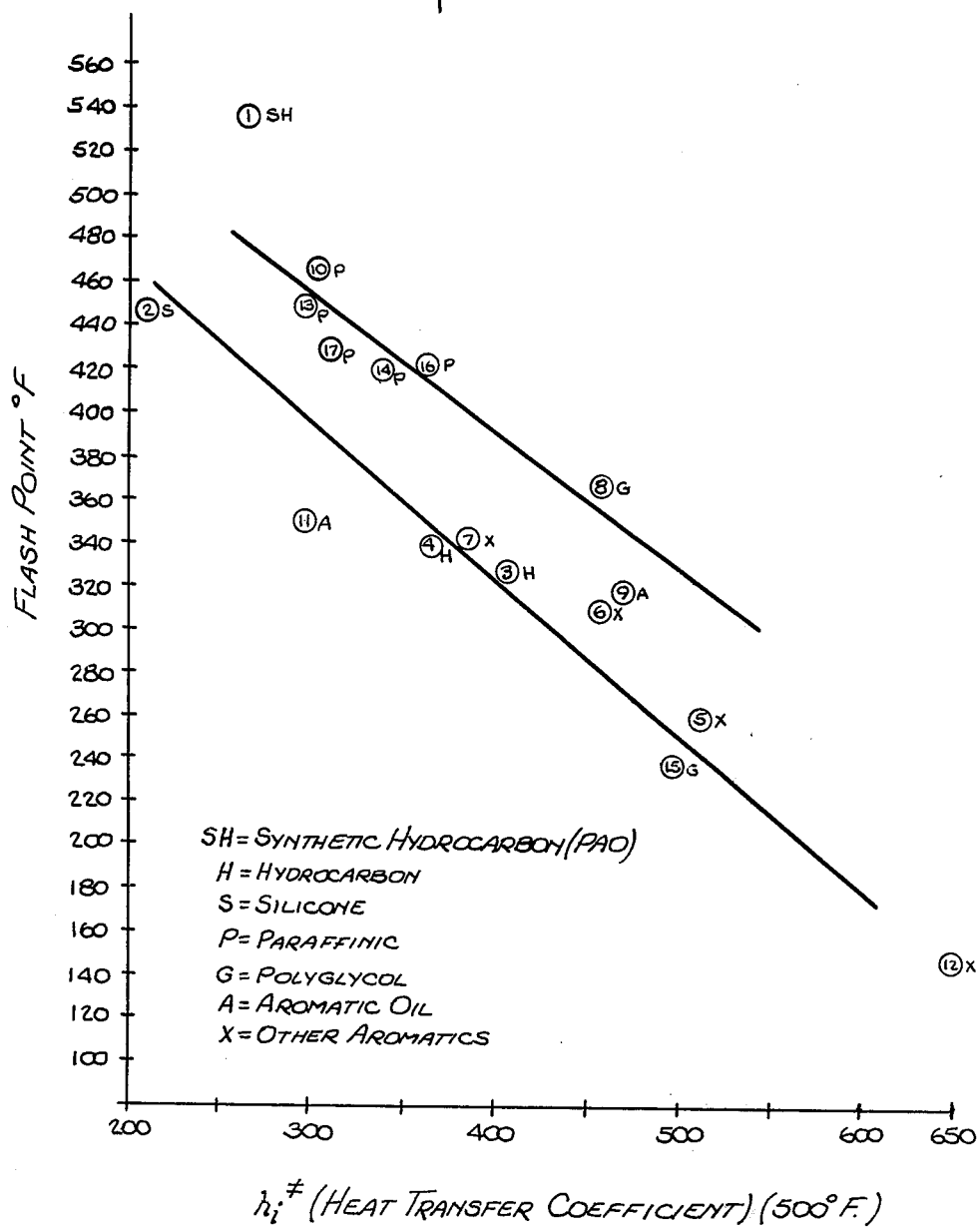

USE OF SYNTHETIC HYDROCARBON OILS AS HEAT TRANSFER FLUIDS

This application is a continuation-in-part of pending U.S. Patent application Ser. No. 853,935 filed Nov. 22, 1977.

Heat transfer fluids are fluids which absorb thermal energy delivered from a source and then surrender that heat to a place of utilization called a "sink." The reversed process is also possible whereby the sink is at a higher temperature than the fluid; and thereby, becomes a source in which case the fluid acts as a coolant. In order to qualify as a heat transfer fluid, many criteria must be met which then determine the ultimate potential use of the fluid. A lengthly list of properties must be determined for each fluid in order to assess its value as a heat transfer fluid.

Some of the properties which need be measured on heat transfer fluids are called "design properties." These are properties which define the heat transfer and transport capabilities of the fluids in question and properties such as the following must be known.

(1) Density, specific gravity and expansion coefficient
(2) Heat capacity
(3) Heat content
(4) Heat conductivity
(5) Viscosity.

A second group of properties which must be defined are construction properties which are the limiting properties which ultimately fix the range of application for the heat transfer fluid. These are called the "limiting properties," and they consist of:

(1) The physical stability
(2) The chemical stability
(3) The thermal stability
(4) The cost.

A third group of properties which must be measured on any potential heat transfer fluid are operation properties. These properties must be contended with because they involve the compatibility of the fluid and its environment; and these are called "handling properties." Such parameters must be known as the following:

(1) Surface tension
(2) Corrosivity
(3) Flammability
(4) Toxicity
(5) Electrical properties
(6) Appearance
(7) Order
(8) Biodegradability
(9) Compatibility with materials of construction and the environment.

Poly-alpha-olefins are particularly suited for use as heat transfer fluids because of their compact, highly branched structure. This structure leads to the following properties which are advantageous:

(1) They have a low viscosity for a given molecular weight versus mineral oil.
(2) They have very high flash and fire points for a given viscosity.
(3) They have very high viscosity index which ensures good low temperature fluidity.
(4) They have excellent oxidative stability where there is the occasional unavoidable exposure to air during operation.
(5) Their compact, high molecular weight, pure hydrocarbon structure, renders them odor-free, non-toxic and biodegradable.

A desirable trait for any heat transfer fluid is that the flash point be greater than maximum use temperature. This is particularly important in solar heat transfer fluids. This will be dealt with in more detail in Example II.

Poly-alpha-olefins, having flash points of at least 530° F. coupled with pour points not higher than $-35°$ F. and Kinematic viscosities not higher than 25 CTS at 210° F. so that they can maintain good pumpability below room temperature, can be prepared as described in U.S. Pat. No. 4,041,098. They, thus, offer a combination of properties unattainable by the use of other pure hydrocarbon fluids.

Although water is, on the basis of heat transfer preformance alone, the ultimate heat transfer fluid, it has certain drawbacks which tend to some extent to detract from its use as a heat transfer fluid. In commercial systems, its low boilint point often dictates the use of pressurized systems with resultant increased cost. In solar application where ambient temperature frequently drop below 32° F., drainback capabilities must be incorporated into systems utilizing water to prevent damage to the collector from freezing. Drainback introduces air into the system which also leads to rusting in the collector. The freezing point of water can, of course, be lowered by the addition of ethylene or propyleneglycol. However, glycols readily form corrosive acids and require frequent analysis and buffering to ensure against deposit formation and excessive corrosion. Use of glycols also requires control of systems utilizing them to lower temperatures because of the case of formation of formic, oxalic acids and other corrosive and toxic species.

It has been determined that an ideal replacement for water and ethylene glycol is synthetic hydrocarbon oil. The hydrocarbon oils which can be used are those produced from alpha-olefins of $C_6$ to $C_{12}$ such as hexene, heptene, octene, nonene, decene, undecene, dodecene.

The synthetic hydrocarbon oils useable herein are those having average molecular weights essentially between about 600 and 1,000, preferably between 650 and 900. A preferred feature of the synthetic hydrocarbon oil is that it be of low unsaturation. It has been determined that there is a substantially direct relationship between the moles of unsaturation (C=C) and the effectiveness of the antioxidant system. Thus, the synthetic oil should have less than about 0.25 mole of (C=C) per 1,000 gm. of oil, preferably less than 0.15, and most preferably less than 0.05.

In addition, copolymers of $C_6$ through $C_{12}$ are also operable for use as heat transfer fluids as well as blends of these copolymers with alpha-olefins of $C_6$-$C_{12}$. Blends of the alpha olefins with certain saturated hydrocarbon based mineral oils can also be used.

Especially preferred as heat transfer fluids for use pursuant to the present invention, are hydrocarbon oils prepared from alpha olefins of $C_8$, $C_9$ and/or $C_{10}$ and mixtures thereof, which have a pour point of no higher than about $-35°$ F., a kinematic viscosity no higher than about 25 centistokes at 210° F. and a flash point of at least about 530° F.

Various antioxidant components may be added to the oils mentioned to prolong the life of said oils during use. One such antioxidant system is disclosed in U.S. Pat. Nos. 4,110,234 and 4,122,021 and which are incorporated herein by reference. Phenolic type antioxidants which are well known in the art can also be used.

The poly-alpha-olefins of the present invention offer a unique combination of low flammability, good pumpability, non-toxicity, non-corrosivity, biodegradability, component and environmental compatability, high interfacial tension (lead resistance) and intermediate cost.

The non-solar heating uses for heat transfer fluids are varied and diverse. They can function both as coolants or as heat carriers from a heat source. Such fluids can be circulated through or around areas where it is desirable to remove heat as in controlling the exothermicity of reactions; in the cooling of reactor effluents; in the cooling of friction produced in the grinding, cutting or rolling of metal; as quenchants for hot metals and the like.

Transfer of heat from a source to sink is perhaps, industrially, a more vital function. Numerous industrial processes require heat. Circulation of an externally heated fluid through or around the area to be heated is done utilizing heat transfer systems designed for each particular application. Heating is necessary, frequently, in the performance of chemical reactions, the processing (molding, extruding, milling or otherwise shaping) of rubbers and plastics, vulcanization of rubbers and many other industrially important areas. Example IV describes the utilization of the fluids of the instant invention in one such system.

A potentially large use of heat transfer fluids is in the collection of solar energy for home or even industrial utilization. Although solar radiation is universally available, it is a diffuse form of energy which requires large collection areas. The conversion of this solar energy to a form of useful energy for heating or electrical energy production is the job of what is referred to hereinafter as a "solar energy system". These systems are further classified as active or passive. The most fundamental passive heating systems include large south-facing window areas in a home, the heating of swimming pool water by direct sunlight on the pool's free water surface, the heating of the water confined in a garden hose by direct sunlight, etc. Active systems include forced circulation of a heat transfer fluid through some sort of solar energy collector to transmit the collector's absorbed energy as sensible heat to a heat storage facility or directly for use in partical heating or cooling systems. Direct photo-volatic energy conversion is another means of solar energy use but is not of concern in this discussion.

Solar energy is transmitted to earth by electromagnetic radiation and must be converted to heat before it can be used. A solar energy collector intercepts this radiated energy, converts it to thermal energy and transfer a part of this heat to a working fluid that may be liquid or gaseous. There are two types of collectors: concentrating and non-concentrating. The concentrating type uses lenses or mirrors to achieve high flux densities and consequently operates at very high temperatures. Non-concentrating, or flat plate, collectors intercept solar radiation on a flat, or essentially planar, absorber surface from which heat is transferred and used in the required thermal application. As such, it operates at lower temperatures, although these temperatures can be 100° F. higher than the environment.

BRIEF DESCRIPTION OF THE DRAWINGS

FIG. 1 is a schematic cross sectional view of a basic flat plate collector.

FIG. 2 is a schematic diagram of a typical closed loop type solar heated domestic hot water system.

FIG. 4 is a plot of flash point vs. heat transfer coefficient for fluids listed in Table I.

FIG. 1 is a schematic cross sectional view of a basic flat plate collector. The flat plate collector consists of transparent flat front plates 1 and 2 separated from each other and spaced from "black" solar energy absorbing plate 3 which contains insulation 4 on its rear surface to prevent heat losses from the rear and which contains means for transferring the absorbed energy to the fluid in tubes 5. Transparent front plates 1 and 2, the absorber plate 3 and the insulation 4 are mechanically held in proper position by the case 6 which also serves to anchor the assembly to the house roof or any other supporting structure. Further, transparent front plates 1 and 2 reduce convection and radiation losses to the atmosphere. Insulation 4 reduces conduction losses.

Figure 3:
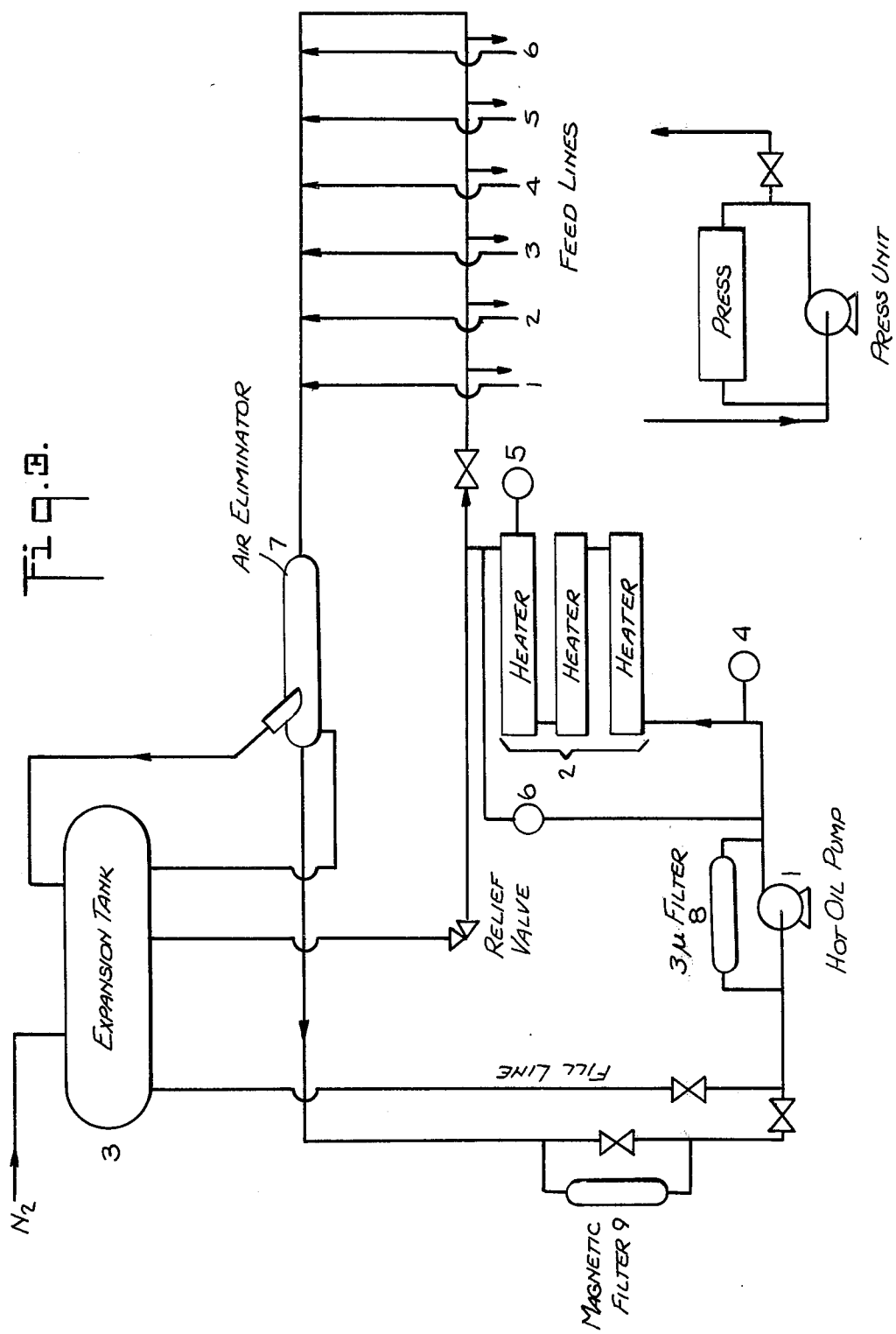
FIG. 3 depicts the main parts of a commercially operating heat transfer system.

The present invention comprises the use of hydrocarbon oils as the heat transfer fluid which carries the energy absorbed in tubes 5 to the storage media where it is utilized.

Front covers 1 and 2 are generally glass or plastic that is transparent to "incoming solar radiation," referred to herein as "insolation", and opaque to the infrared reradiation from the absorber surface. These covers also act as a convection shield to further reduce upward heat losses from the abosrber plate.

Absorber plate 3 can be any metal, plastic or rubber sheet material which has the ability to convert solar radiation to thermal energy. As this energy is convered, the plate's temperature rises. Heat is removed from plate 3 by the circulating heat transfer fluid, in this case a hydrocarbon oil, in contact with the plate via tubes 5 which provide integral flow passages. In gaseous systems, air is the heat transfer fluid which transfers the heat from the absorber to a house heating duct or to a storage media, usually rocks in a large insulated confined bin or cavity, for later use. In liquid systems, the heat transfer fluid is circulated via a pump through the collector to a storage tank or for direct use in a so-called "open system". Since anti-freeze protection of the heat transfer liquid must be provided in many geographical areas as well as corrosion protection for the metal components in the system, "closed loop" systems are almost exclusively used. In such a system, a recirculating fluid transfers heat energy from the collector's absorber plate to the domestic water line or space heating line via a heat exchanger or intermediate storage tank.

FIG. 2 is a schematic diagram of a typical closed loop type solar heated domestic hot water system. At least one flat plate collector 10 of type illustrated in FIG. 1 above receives the insolation which causes the temperature of the hydrocarbon oil heat transfer fluid to be raised. The fluid flows through line 11 as a result of pressure applied via pump 12 and back into the tubes in collector 10 thus forming a closed cycle. The pressure in the closed cycle is about 10 psi. Expansion tank 13 is in series in the closed system to take up any excess of oil fluid which occurs when the fluid expands upon heating while the system is in use. Relief valve 24 on storage tank 14 is actuated by either thermostatic or pressure senstitive controls which are commercially available. The oil fluid in line 11 travels through coils 14 which are situated in water storage tank 15. The heated oil fluid heats the water in tank 15 which in turn heats the water in coils 16 connected via line 17 to conventional hot water heater 18. An auxiliary heat source 19 is provided to be used when the solar heating system is not in use.

A differential control thermostat 20 with sensor lines extending to collector plate 10 and storage tank 15 is used optionally to start the flow of fluid in the system when the difference between the temperature of the water in the tank and the temperature of the fluid in the collector is a predetermined value, such as about 15° to 20° F. The system is then shut off after sufficient operation narrows the temperature differential to a few degrees.

Valves 21, 22, and 23 serve to direct and control the flow of water from the storage tank through the conventional water heater.

As stated above the recirculating heat transfer fluid used in an active type solar energy system must possess certain properties to ensure efficient, long term operation. Firstly, it must be useful over a temperature range from well below freezing to upwards of 300° F. It must be non-corrosive to the other elements within the system over long periods of time. It must possess a high specific heat to preclude very high pump flow rates. It must be compatible with available pump materials of manufacture including seals. It should be non-toxic to prevent medical problems should leaks occur causing contamination of potable water. It should be low in viscosity and of sufficient lubricity to ensure efficient pump operation with relatively low electrical energy requirements. The poly-alpha-olefins of the instant invention possess the above required properties and have a flash point at least 100° F. above normal stagnation temperatures in flat plate active solar collectors.

The following examples serve to illustrate the usefulness of the fluids of the instant invention as heat transfer fluids;

EXAMPLE I

This example compares (in Table I) a series of commonly used heat transfer fluids. Uniroyal PAO (Fluid 1.)* exhibits an unusual combination of heat transfer properties and high flash point. FIG. 4 is a plot of the fluids listed in Table I, showing the relationship between heat transfer coefficient ($h_i$) and flash point. This graph shows the fluid of the present invention to have a higher flash point of the calculated heat transfer coefficient than the other depicted fluids. The low flammability of the fluids of this invention provides a measure of safety not available from the other commonly used fluids.

*FLUID 1 is PAO 13C, an oligomer of decene-1 having the properties listed in Table 1.

It can be seen that, except for a silicone fluid (Fluid 2.), Uniroyal PAO is the only fluid having a higher flash point than the recommended maximum use temperature. If Uniroyal PAO (Fluid 1.) is used at 400° F., the flash point is 135° F. higher than use temperature. As well as being less costly, the fluid of the instant invention has a higher calculated heat transfer coefficient at 500° F. than the silicone fluid as well as having distinctly lower flammability at maximum use temperature than the other listed fluids.

TABLE I
COMPARATIVE PROPERTIES OF VARIOUS HEAT TRANSFER FLUIDS

| FLUID | TYPE | $\rho$ | $C_P$ | K | $\mu$ | $\lambda$ | Min. Use Temp | Max. Use Temp | Flash Pt. °F. | Fire Pt. °F. | Pour Pt. °F. |
|---|---|---|---|---|---|---|---|---|---|---|---|
| (1) PAO 13C (UNIROYAL) | Synthetic Hydrocarbon | 42.7 | 0.63 | .065 | 2.36 | 29.0 | +50° F. | 600° F. | 535 | 585 | −50 |
| (2) Dow Corning Q2-1132 | Silicone | 46.8 | 0.44 | .076 | 3.80 | 20.6 | −50 | 400 | 450 | 500 | −121 |
| (3) Brayco 888 (Bray Oil) | Hydrocarbon | 40.5 | 0.65 | .065 | 0.78 | 27.5 | −20 | — | 325 | 350 | <−90 |
| (4) Suntemp | Hydrocarbon | 45 | 0.64 | .075 | 1.40 | 28.8 | +15 | — | 340* | 380* | ~−40 |
| (5) Dowtherm A | Diphenyloxide & Biphenyl | 53 | 0.537 | .0645 | 0.641 | 28.5 | 60 | 750 | 255 | 275 | — |
| (6) Dowtherm G | Di- & Tri- Aryl Ethers | 57.5 | 0.51 | .0706 | 1.065 | 29.3 | 60 | 650 | 305 | 315 | −18 |
| (7) Thermizol 66 | Modified Terphenyl | 51.2 | 0.58 | .0637 | 1.19 | 29.7 | 50 | 650 | 334 | 374 | — |
| (8) OCON HTF-X600 | Polyglycol | 46.5 | 0.795 | .0762 | 1.08 | 36.9 | −60 | 600 | 365 | 385 | — |
| (9) Therminol 60 | Aromatic Oil | 52.0 | 0.593 | 0.656 | 0.93 | 30.8 | −50 | 600 | 310 | 320 | — |
| (10) Gulf Security 53 | Paraffinic Oil | 45.5 | 0.718 | .0661 | 2.03 | 32.7 | 70 | 600 | 460 | 520 | — |
| (11) Mobil Therm 600 | Aromatic Oil | 51.5 | 0.610 | .060 | 1.9 | 31.4 | 40 | 600 | 350 | — | — |
| (12) Dowtherm J | Alkylated Aromatic | 40.3 | 0.649 | .0655 | 0.29 | 26.1 | −100 | 575 | 145 | 155 | <−100 |
| (13) Shell Thermia 33 | Paraffinic Oil | 44.9 | 0.650 | .066 | 1.915 | 29.2 | 70 | 550 | 455 | 465 | — |
| (14) Dowtherm HP | Paraffinic Oil | 44.9 | 0.69 | .0675 | 1.62 | 31.0 | 70 | 550 | 420 | 460 | — |
| (15) UCON HTF-500 | Polyglycol | 54.3 | 0.588 | .072 | 4.42 | 31.8 | 0 | 500 | 500 | 600 | — |
| (16) Exxon Caloria HT-43 | Paraffinic Oil | 44.3 | 0.70 | .068 | 1.46 | 31.8 | 70 | 500 | 420 | 460 | — |
| (17) Texatherm H₂O | Paraffinic Oil | 44.9 | 0.856 | 0.67 | 1.78 | 29.4 | 70 | 500 | 430 | — | — |

| FLUID | TYPE | $h_i$* | $h_i$** | Flash Point-Max. Use Temp |
|---|---|---|---|---|
| (1) PAO 13C (UNIROYAL) | Synthetic Hydrocarbon | 260 | — | +35° F. |
| (2) Dow Corning Q2-1132 | Silicone | 213 | — | +50 |
| (3) Brayco 888 (Bray Oil) | Hydrocarbon | 414 | — | −175 |
| (4) Suntemp | Hydrocarbon | 370 | — | −160 |
| (5) Dowtherm A | Diphenyloxide & Biphenyl | 519 | 523 | −495 |
| (6) Dowtherm G | Di- & Tri- Aryl Ethers | 457 | 503 | −345 |
| (7) Thermizol 66 | Modified Terphenyl | 384 | 389 | −316 |
| (8) UCON HTF-X600 | Polyglycol | 465 | 470 | −235 |
| (9) Therminol 60 | Aromatic Oil | 448 | 453 | −290 |
| (10) Gulf Security 53 | Paraffinic Oil | 299 | 284 | −140 |
| (11) Mobil Therm 600 | Aromatic Oil | 302 | 303 | −250 |
| (12) Dowtherm J | Alkylated Aromatic | 651 | 653 | −430 |

TABLE I-continued
COMPARATIVE PROPERTIES OF VARIOUS HEAT TRANSFER FLUIDS

| | | | | | |
|---|---|---|---|---|---|
| (13) | Shell Thermia 33 | Paraffinic Oil | 294 | 271 | −95 |
| (14) | Dowtherm HP | Paraffinic Oil | 339 | 341 | −130 |
| (15) | UCON HTF-500 | Polyglycol | 237 | 239 | 0 |
| (16) | Exxon Caloria HT-43 | Paraffinic Oil | 345 | 348 | −8 |
| (17) | Texatherm | Paraffinic Oil | 308 | 312 | −70 |
| | | | 3041.5 | 3041 | |

$\rho$ = Density, lbs/ft.$^3$
$C_P$ = Specific Ht., BTU/LB/°F.
K = Thermal Conductivity, BTU/HR/FT$^2$-°F./Ft
$\lambda$ = Heat Capacity BTU/Ft$^3$ °F.
$\mu$ = Viscosity, Lb/Hr/Ft
Values for , $C_P$, K, and given for fluids 1,2,3 & 4 are extrapolated estimations based on data available from manufacturer, data on fluids 5 → 17 supplied by American Hydrotherm Corporation.
*As measured by UNIROYAL — dashes indicate data not available
$h_i^*$ = Heat transfer coefficient @ 6 FPS inside ¾" Sch. 40 pipe (500° F.)
An Empirical Seider-Tate type equation was generated to fit data supplied by American Hydrotherm Corp.

$$h_1^* = 0.424 \left(\frac{1350\rho}{\mu}\right)^{0.80} \left(\frac{C_p\mu}{K}\right)^{0.33}$$

**American Hydrotherm Data

EXAMPLE II

This example compares the properties of some commonly advocated solar energy heat transfer fluids. Properties such as oxidative stability (related to fluid lifetime), flash point, compatibility with asphalt shingles (for roof installations), and cost are compared. The drawbacks of water based heat transfer systems have been discussed in the specification and so only organic based fluids are compared in Table II.

An N.B.S. bulletin[1] states, "Liquids used in solar-powered equipment shall not be heated to temperatures greater than 100° F. below their flash points under either operating or "no-flow" conditions."

A statement by H.U.D.HU (2) says, "Temperatures attained by fluids in solar systems under operating and no-flow conditions shall not exceed a temperature which is 100° F. below the flash point of the fluid."

These statements coupled with an assessment made by K. W. Kaufman of the Franklin Institute Research Laboratories, who states:[3] "Stagnation temperatures for flat plate collectors can reach 205° C. (400° F.)" indicate that a solar fluid should have a flash point of at least 500° F. in order to meet the safety standards required by N.B.S. and H.U.D.

(1.) NBSIR 76-1187
  Interim Performance Criteria for Solar Heating and Cooling Systems in Commercial Buildings; Chapter 4, Safety, p. 34.
  Center for Building Technology
  Institute for Applied Technology
  N.B.S. Washington, D.C. (Nov. 1976)
  Prepared for ERDA (Division of Solar Energy).

(2.) H.U.D. Pamphlet 4930.2, Chapter 5, p. 40, 1977 Edition of Solar and Domestic Hot Water Systems entitled Intermediate Minimum Property Standards Supplement.

(3.) Non-Corrosive, Non-Freezing and Non-Toxic Heat Transfer Fluids by K. W. Kaufman, Franklin Institute Research Laboratories in: Proceedings of the Annual Meeting, American Section, International Solar Energy Society, Orlando, Florida, June 1977.

TABLE II
COMPARATIVE PROPERTIES OF VARIOUS SOLAR FLUID CANDIDATES

| Fluid | Type Fluid | Oxidative* Stability | Typical Flash Pt °F. | Asphalt Shingle Compatibility | Cost** |
|---|---|---|---|---|---|
| PAO 13C | Synthetic Hydrocarbon | Good | 535 | Good | Med. |
| Dow Corning Q2-1132 | Silicone | Excellent | 450 | Good | High |
| Brayco 880 | Hydrocarbon | Good | 325 | Good | Med. |
| Mobiltherm 600 | Aromatic | Poor | 360 | Poor | Low |
| Therminol 55 | Aromatic | Poor | 355 | Poor | Low |
| Dowtherm HP | Paraffinic | Fair | 420 | Good | Low |
| Exxon Caloria HT43 | Paraffinic | Fair | 420 | Good | Low |
| Dowtherm J | Alkylated Aromatic | Fair | 145 | Poor | Med. |
| Suntemp | Hydrocarbon | Fair | 340 | Good | Med. |

*Usually correlates with Cu or Fe corrosion in collector systems as well as acid, sludge and viscosity increase.
**Low = <$3/gal
Med = $3-8/gal
High = >$8/gal
Note:
More specific data concerning use temperatures and heat transfer capabilities are given in Table I for most of these fluids.

EXAMPLE III

In some commercial heat transfer systems, the fluids in use may be exposed to air, although this is preferably avoided because of the instability of most organic fluids to oxygen at the 400°-450° F. temperature range frequently utilized. This example compares a fluid of the instant invention (PAO-2OE)** with a widely used commercial fluid (Dowtherm G) in a test to determine the susceptibility of these fluids to oxidation by adventitious air which enters the heat transfer system. The accelerated aging test was performed by subjecting the fluids (100 ml) to a temperature of 370° F. for 72 hours while passing a stream of 5 liters of air per hour through the fluids. Magnesium, iron, copper and silver metal specimens were present in the fluids during the test both to catalyze the oxidation making the test more severe, and to assess the corrosivity of the fluids toward the specimens under the test conditions.
**PAO-20E is an oligomer of octene-1.

The fluids of the instant invention proved to be essentially unchanged after the oxidation test, while Dowtherm G experienced a large increase in viscosity, a buildup in acidity and considerable attack on the copper test speciment.

In a separate test, PAO-20E was oxidized for 500 hours at 347° F. without experiencing even a 100% increase in viscosity.

| PAO 20E VS DOWTHERM G OXIDATIVE AGING | | |
|---|---|---|
| KV | PAO-20E* | DOWTHERM G |
| 100° F. | | |
| Before Ageing | 200 CST | 10.1 |
| After Aging | 202 CST | 47.1 |
| % Δ Viscosity | +1% | +366.3 |
| Sludge, Mg/100g | Trace | Trace |
| Acid No, Aged | 0 | 1.34 |
| pH Equivalent | 7 | 5.62 |
| Cu Loss, mg./cm$^2$ | −.06 | −24.6 |
| Fe Loss, mg.cm$^2$ | −.02 | +.02 |

*containing proprietary Uniroyal antioxidant

EXAMPLE IV

This example illustrates the use of polyalphaolefin fluids in a commercially operating heat transfer system. The system is an electrically heated thermal liquid system designed by American Hydrotherm Corporation. It is utilized in the heating of six presses for the vulcanization of compounded rubber formulations. FIG. 3 depicts the main parts of the system. The system consists of a 100 GPM pump 1 driven by a 7.5 HP motor. The heat sources are three 30 kw heaters in series 2. Fluid volume changes are compensated for by the expansion tank 3. The temperature of the system is controlled by an automatic electric instrument sensing the temperature at the inlet to the heaters 4 and switching them on and off as required. Overheating is prevented by a thermostatic switch control at the heater outlet 5. A differential pressure switch 6 guards the heaters against operation at low flow volume.

Protection of the fluid in the system is accomplished by a nitrogen blanket over the expansion tank maintained at 10 PSIG. An air eliminator 7 removes entrained gases from the circulating fluid. Particulates are removed by a 3μ mesh filter 8 and a magnetic filter 9.

The system described above utilizes approximately 250 gallons of heat transfer fluid, e.g., PAO-20E, with 0.7 parts antioxidant for protection against adventitious air, was the fluid chosen for this application. The system is currently in use and has been operating continuously for over 2500 hours at temperatures of 400°-450° F. Weekly samples were taken in order to detect any changes in the heat transfer fluid. Infrared spectra, viscosities and metals content were monitored. No change in any of these parameters was detectable. The appearance of a carbonyl absorption at about 1710 cm$^{-1}$ in the infrared spectrum would signal incipient oxidation, however, no carbonyl absorption is visible in the spectrum. Thermal degradation would be detectable by infrared and a decrease in viscosity. By these tests thermal degradation was completely absent. Oxidative degradation, as well as being detectable by infrared, is always accompanied by an increase in viscosity.

The viscosity of the fluid, however, remained constant indicating no thermal or oxidative degradation after more than 2500 hours. Analysis of the fluid for metals shows a low (10 PPM), but constant level of iron and copper in the fluid. The appearance (pale clear yellow) and odor (none) of the fluid were also unchanged after this period of operation.

The heat transfer capabilities of the fluid were obvious in that a constant temperature was easily maintained across all six presses. This, coupled with the outstanding thermal and oxidation-resistant properties of the fluid demonstrates its utility as a heat transfer fluid. The flash point (535° F.) and fire point (590° F.) were well above the maximum operating temperature in this system, lending an element of safety not readily attainable with currently used fluids.

EXAMPLE V

This example compares the oxidative stability of a typical PAO of the instant invention with that of a commercially available hydrocarbon solar fluid, "SUN-TEMP".[1] Some of the properties of "SUN-TEMP" have already been presented in Examples I and II. The PAO utilized in this example had a $Kv_{210}$ of 20 CST and a flash point of 540° F. Oxidative aging was performed on the two fluids in a test identical to that described in Example II.

[1]Offered by Research Technology Corporation 151 John Downey Drive New Britain, Conn. 06051

| Fluid | Added Antioxidant | Aged Neutral No. | % $KV_{100}$ | Sludge, mg |
|---|---|---|---|---|
| PAO-20E | Uniroyal | 0 | +5 | 10 |
| Sun-Temp | Uniroyal | 6.1 | +69.9 | 1,596 |
| Sun-Temp | None | 8.6 | +62.8 | 1,249 |

Clearly, the fluid of the instant invention is superior in all parameters after testing. Acid build-up (Neutral No.) is zero, viscosity change much lower and formation of sludge very much lower than "SUN-TEMP". Even when the same proprietary Uniroyal antioxidant was added to "SUN-TEMP", its oxidative stability was not increased.

EXAMPLE VI

This example illustrates the thermal stability of the PAO's of the present invention. Fluids were heated at 550°, 600° and 625° F. to detect the onset of thermal decomposition.

One hundred grams of PAO was placed in a 250 ml round bottomed flask with magnetic stirrer, Y tube, thermometer and reflux condenser with $N_2$ pressure head. Samples were heated electrically and temperature was controlled ±2° F.

| Temperature | Hours | Comments |
|---|---|---|
| 550° F. | 120 hrs. | No evidence of decomposition as seen by lack of "smoking", lack of change in infra red spectrum and lack of change in viscosity |
| 600° F. | 120 hrs. | (as above) |
| 625° F. | 72 hrs. | Some obvious decomposition occurred within 24 hours as evidenced by smoke formation, increased reflux, appearance of unsaturation by infra-red and decreased viscosity of product of aging. Test terminated after 72 hours. |

This example shows that PAO's appear to be thermally stable at 600° F., but that pyrolysis occurs slowly at 625° F.

We claim:

1. In a heat transfer system comprising heat source means, heat sink means, a heat transfer fluid and means for conducting said heat transfer fluid between said source means and said sink means; the improvement comprising using as said heat transfer fluid in said system a hydrocarbon oil produced from homopolymers, copolymers, or combinations thereof, of alpha olefin monomers having from six to twelve carbon atoms, said oil having a pour point of no higher than −35° F., a kinematic viscosity no higher than 25 centistokes at 210° F., and a flash point of at least 530° F.

2. The system defined in claim 1 wherein said hydrocarbon oil possesses less than about 0.25 mole of (C═C) per 1000 grams of said oil.

3. The system defined in claim 1 wherein said hydrocarbon oil possesses less than about 0.15 mole of (C═C) per 1000 grams of said oil.

4. The system defined in claim 1 wherein said hydrocarbon oil possesses less than about 0.05 mole of (C═C) per 1000 grams of said oil.

5. The heat transfer system defined in claim 1 wherein said alpha olefin monomers have from eight to ten carbon atoms.

6. The heat transfer system defined in claim 5 wherein said homopolymers, copolymers or combinations thereof have a molecular weight between 600 and 1000.

7. The heat transfer system defined in claim 5 wherein said homopolymers, copolymers or combinations thereof have a molecular weight between 650 and 900.

8. The heat transfer system defined in claim 5 wherein said alpha olefin monomer has eight carbon atoms.

9. The heat transfer system defined in claim 8 wherein said homopolymer has a molecular weight between 600 and 1000.

10. The heat transfer system defined in claim 8 wherein said homopolymer has a molecular weight between 650 and 900.

11. The heat transfer system defined in claim 5 wherein said alpha olefin monomer has nine carbon atoms.

12. The heat transfer system defined in claim 11 wherein said homopolymer has a molecular weight between 600 and 1000.

13. The heat transfer system defined in claim 11 wherein said homopolymer has a molecular weight between 650 and 900.

14. The heat transfer system defined in claim 5 wherein said alpha olefin monomer has ten carbon atoms.

15. The heat transfer system defined in claim 14 wherein said homopolymer has a molecular weight between 600 and 1000.

16. The heat transfer system defined in claim 14 wherein said homopolymer has a molecular weight between 650 and 900.

17. The system defined in claim 1 wherein said hydrocarbon oil is blended with a saturated hydrocarbon based mineral oil.

18. The system defined in claim 1 wherein said hydrocarbon oil is blended with a phenolic antioxidant.

19. The system defined in claim 1 wherein said hydrocarbon oil is blended with
(a) phenylated naphthylamine,
(b) a sulfur containing compound being selected from compounds the formulae R—S—R and R—S—S—R wherein the R groups are the same or different and are selected from the group consisting of alkyl, aryl, aralkyl, alkaryl, alkanoate, thiazole, imidazole, phosphorothionate, and B-ketoalkyl radicals, and where applicable, said sulfur containing compound contains no more than one phenyl to sulfur bond; and
(c) a metal selected from the Groups VIII, Ib and IIb of the Periodic Table and having an atomic number greater than 26 with the exception of silver (47); wherein (a) is present in from about 0.15 to 1.25 parts, and (b) is present in from about 0.05 to 4 parts, both by weight per 100 parts of oil, and (c) is present in 0.01 to 25 parts per million of oil.

20. The heat transfer system of claim 1 which is used in an active solar energy system, wherein the heat source means is a collector, the heat sink means is heat storage means, a heat transfer fluid and means for conducting said heat transfer fluid between said collector and said heat storage means.

21. The system defined in claim 20 wherein said hydrocarbon oil possesses less than about 0.25 mole of (C═C) per 1000 grams of said oil.

22. The system defined in claim 20 wherein said hydrocarbon oil possesses less than about 0.15 mole of (C═C) per 1000 grams of said oil.

23. The system defined in claim 20 wherein said hydrocarbon oil possesses less than about 0.05 mole of (C═C) per 1000 grams of said oil.

24. The system defined in claim 20 wherein said hydrocarbon oil is produced from a homopolymer.

25. The system defined in claim 20 wherein said homopolymer has a molecular weight between about 600 and 1000.

26. The system defined in claim 20 wherein said homopolymer has a molecular weight between about 650 and 900.

27. The system defined in claim 20 wherein said hydrocarbon oil is produced from a copolymer.

28. The system defined in claim 27 wherein said copolymer has a molecular weight between about 600 and 1000.

29. The system defined in claim 27 wherein said copolymer has a molecular weight between about 650 and 900.

30. The system defined in claim 20 wherein said hydrocarbon oil is blended with a saturated hydrocarbon based mineral oil.

31. The system defined in claim 20 wherein said hydrocarbon oil is blended with a phenolic antioxidant.

32. The system defined in claim 20 wherein said homopolymer is polyoctene.

* * * * *